S. P. WHITESIDE.
VARIABLE SPEED TRANSMISSION MECHANISM.
APPLICATION FILED OCT. 27, 1915.
1,194,107.
Patented Aug. 8, 1916.
4 SHEETS—SHEET 4.
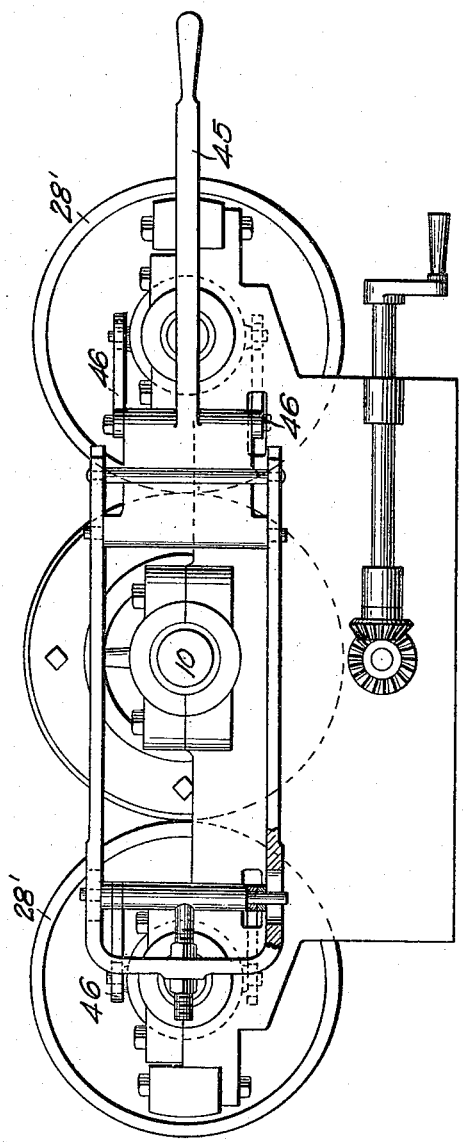
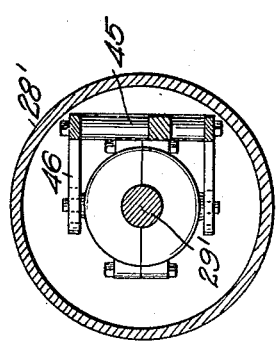
WITNESSES
INVENTOR
S. P. Whiteside
BY
ATTORNEYS

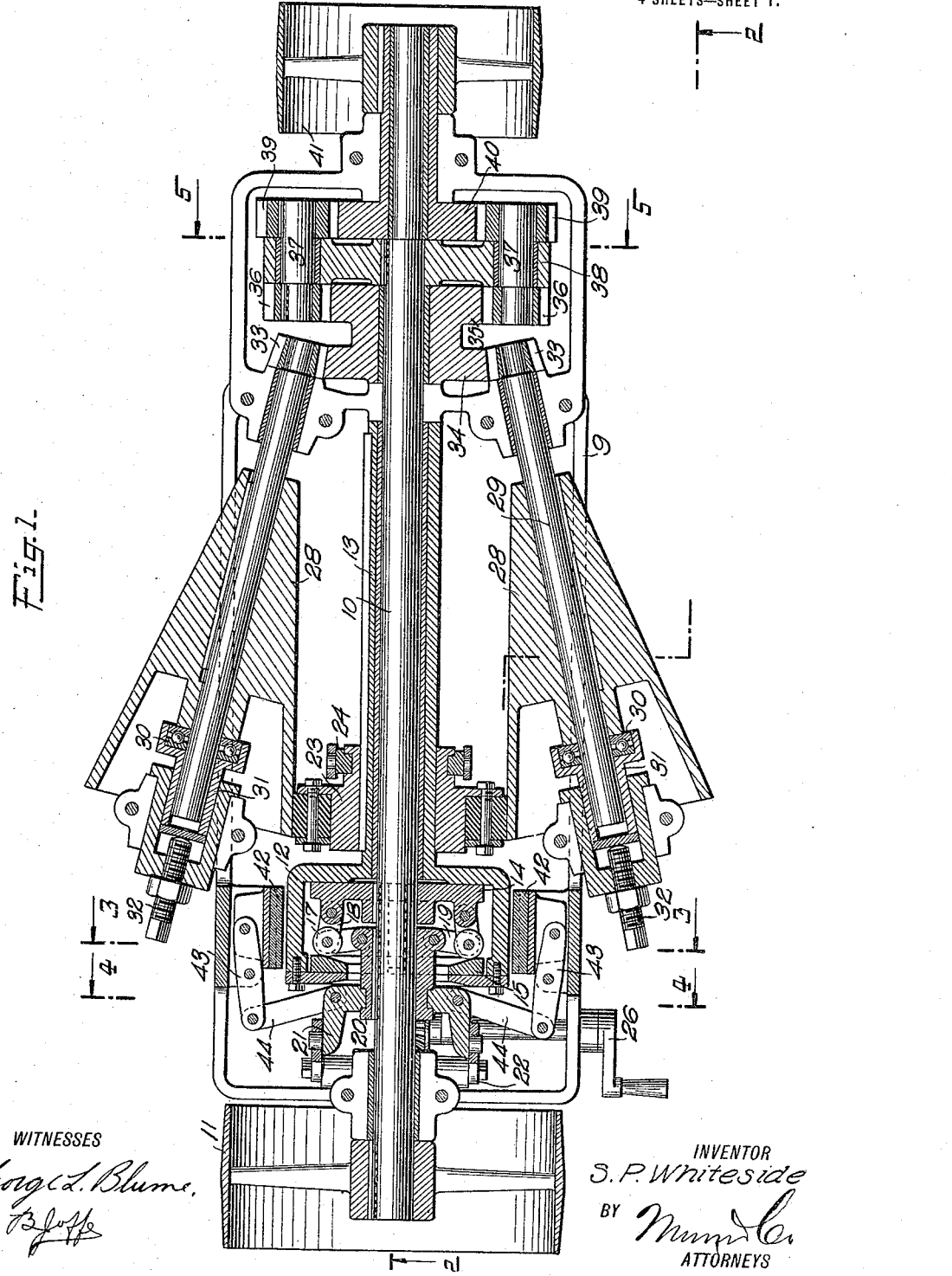

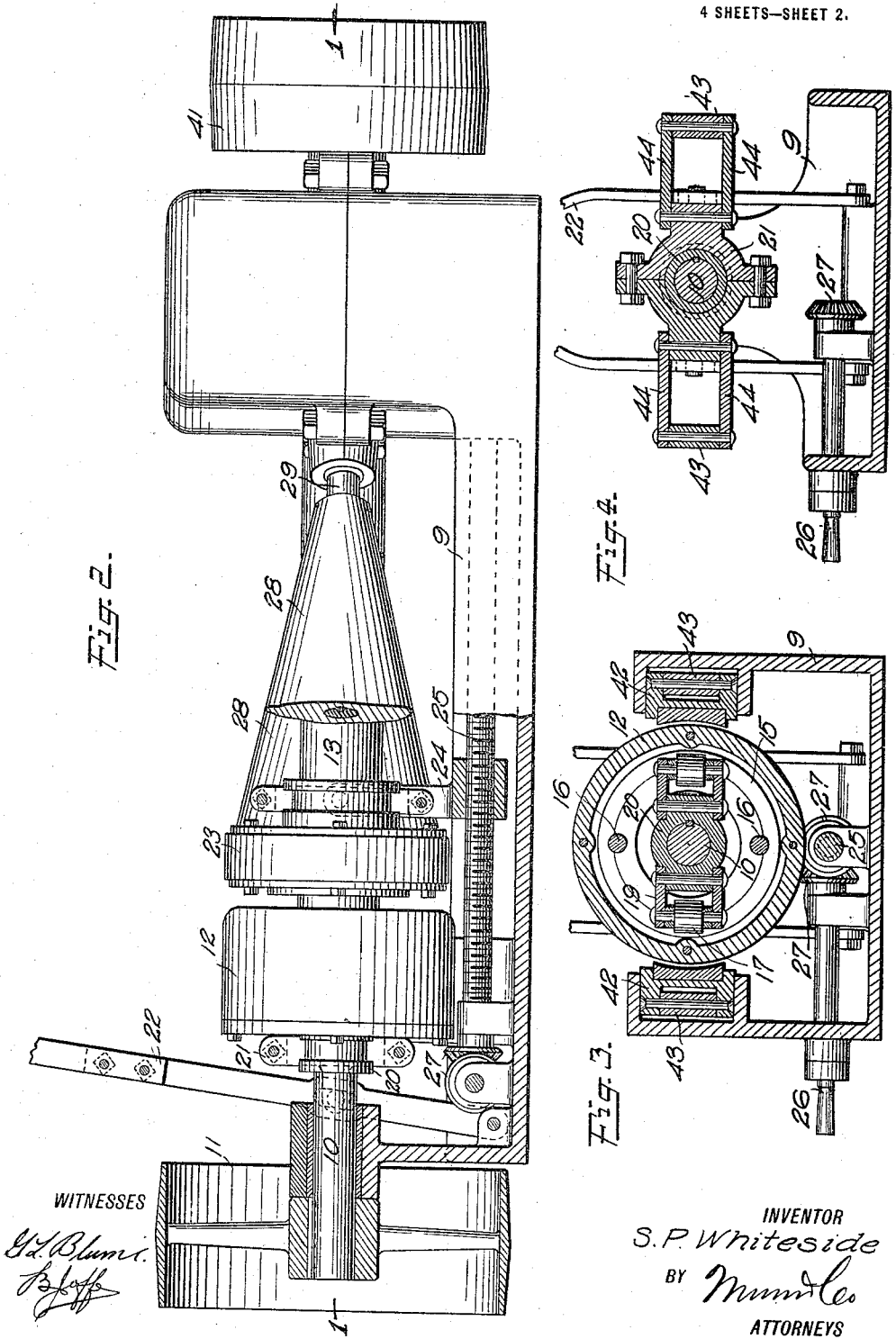

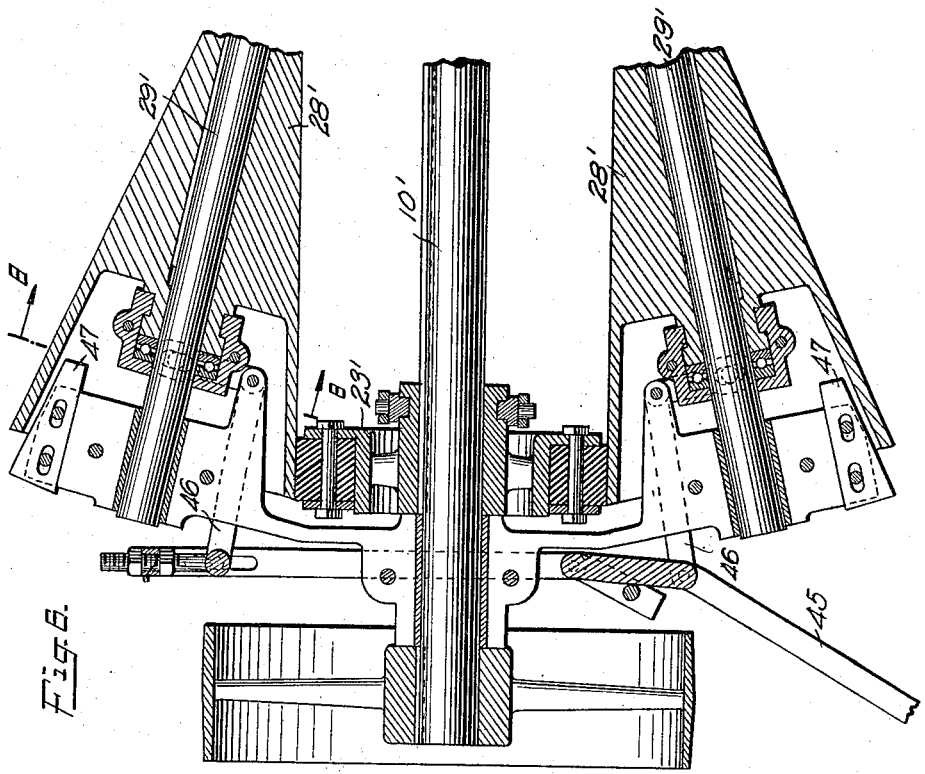
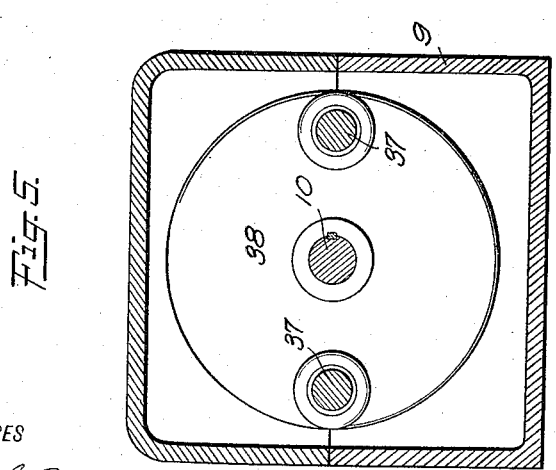

UNITED STATES PATENT OFFICE.

SAMUEL P. WHITESIDE, OF CURTIS BAY, MARYLAND.

VARIABLE-SPEED-TRANSMISSION MECHANISM.

1,194,107.

Specification of Letters Patent.

Patented Aug. 8, 1916.

Application filed October 27, 1915. Serial No. 58,136.

*To all whom it may concern:*

Be it known that I, SAMUEL P. WHITESIDE, a citizen of the United States, and a resident of Curtis Bay, in the county of Anne Arundel and State of Maryland, have invented a new and Improved Variable-Speed-Transmission Mechanism, of which the following is a full, clear, and exact description.

My invention relates to transmission mechanisms adapted to transmit variable speeds by means of frictional members and planetary gearing coöperating therewith.

An object of the invention is to provide a simple, efficient and strong transmission mechanism wherethrough power can be transmitted at variable speeds, the range of which speeds is wider than could be obtained directly through a frictional, variable-speed device with members of definite proportions.

A further object of the invention is to provide a variable-speed transmission mechanism in which planetary gearing is utilized to increase the power of a frictional variable-speed device by reducing the range of speeds thereof.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1 is a horizontal section on line 1—1, Fig. 2, of my variable-speed transmission; Fig. 2 is a vertical elevation, partly in section, of the transmission mechanism on line 2—2, Fig. 1; Fig. 3 is a transverse section on line 3—3, Fig. 1; Fig. 4 is a similar section on line 4—4, Fig. 1; Fig. 5 is a transverse section on line 5—5, Fig. 1; Fig. 6 is a fragmentary, horizontal section of a modified form of my transmission mechanism; Fig. 7 is an end elevation, partly in section, of a transmission mechanism, shown in Fig. 6, certain parts thereof being broken away to show the details of construction; and Fig. 8 is a cross section through the frictional cone of the mechanism on line 8—8, Fig. 6.

Referring to the drawings, 9 is a frame in which a driving shaft 10 is mounted to rotate. A pulley 11 is provided at one end of the shaft for transmitting power thereto. Rotatably mounted on the shaft 10 is a friction-clutch casing 12 having a sleeve 13 which constitutes the bearing of the casing 12 on the shaft 10. Located within the casing 12 is a friction disk 14 which is constrained to rotate with the shaft 10 to which it is keyed. A friction ring 15 is carried by the friction disk 14 on pins 16. (See Fig. 3.) The friction disk 14 carries rollers 17 on links 18. These rollers are adapted to engage a cam surface on the friction ring 15 through the medium of links 19, which connect the rollers to a collar 20 mounted to rotate with the shaft but free to slide upon it. The collar is actuated through the medium of a yoke 21 and an operating lever 22 and whereby the friction clutch formed by the casing 12, friction disk 14 and ring 15 can be placed into operative or into inoperative position.

A friction roller 23 is mounted on the sleeve 13 of the clutch casing 12 so as to participate in the rotation thereof, while it is free to slide upon the sleeve. A yoke 24 engaging the roller is threaded on to a screw 25 extending longitudinally of the shaft 10 and revoluble by means of a crank 26 through the medium of a pair of miter gears 27, whereby the roller is moved longitudinally on the sleeve 13. Frictionally engaging the roller 23 are friction cones 28 each keyed to a shaft 29 which bears in the frame 9 so that the elements of the cone facing the shaft 10 are substantially parallel therewith. The larger end of each friction cone is recessed to accommodate a thrust ball bearing 30 carried by a sleeve 31 adjustable on the ends of the shaft 29, so that wear can be taken up by means of a set screw 32 carried by the bearings of the frame.

A planetary gearing is coupled to the cones 28 by bevel pinions 33, each keyed to the other end of each shaft 29. A gear 34 of the planetary gearing is rotatably mounted on the shaft 10 and is in mesh with the pinions 33. Integral with the gear 34 is a gear 35, meshing with which are pinions 36 keyed to pins 37 rotatably mounted on a disk 38 which is keyed to the shaft 10 and forms that part of the planetary gearing which is secured to the driving member. Pins 39 are also keyed to the pins 37. In mesh with the pinions 39 is a gear 40 which is free to turn on the shaft 10 and which forms the part of the planetary gearing to be connected with the driven member. In this case a pulley 41 is constrained to turn with the gear 40, and thereby the desired variation of speed to be obtained in the mechanism can be transmitted. The different parts of the mechanism can be so proportioned that the driven member will be stationary when the roller 23 is in the position shown in Fig. 1, although the cones 28 and the double gear 34—35 have a definite speed.

As the friction roller 23 is moved to the right it comes in contact with the small diameters of the cones 28 causing them, and in turn the double gear 34—35, to rotate faster; and when the friction roller 23 comes in contact with the smallest diameter of the cones, gear 35 will rotate substantially at the same speed as the shaft 10, the speed of which is maintained constant. The reversing of pulley 41 is obtained by arresting the rotation of the double gear 34—35 through the medium of a brake mechanism adapted to engage the periphery of the clutch casing 12 after the clutch has been moved past its neutral position in uncoupling the friction roller from the driving shaft. The brake mechanism contains a pair of brake shoes 42, each carried by a rocking link 43, in turn connected by links 44 to the yoke 21.

In the modified structure shown in Figs. 6 to 8 inclusive, the friction clutch is dispensed with and a friction roller 23' is mounted directly on the shaft 10'. To arrest the rotation of the double gear when a reverse operation is desired, the friction cones 28' are slidably mounted on their respective shafts 29'. The friction cones 28' are displaceable on their shafts by an operating lever 45 through the medium of bell-crank levers 46 which connect the operating lever to the cones. The bell-crank levers are pivotally mounted on the extension of the frame, which extension also carries brake shoes 47 each adapted to engage a corresponding recess of the larger end of the friction cone when the same is moved by the operating lever toward the shoes. The engagement of the brake shoes 47 with the friction cones arrests the movement of the double gear and thereby permits the reverse rotation of the power-transmitting pulley.

It will be noted that on my mechanism, the greater torque is obtained at slower speed, due to the fact that the friction roller 23 contacts with the larger diameter of the friction cones at the lowest speeds. In the mechanism as described a constantly reversing speed is secured when the friction cones are arrested in their movement.

From the above description it will be seen that my invention is characterized by a planetary gearing driven by a variable-speed mechanism, the planetary gearing having a driven part coupled to a driven member, and having a third part mounted to participate in the rotary movement of the driving member which actuates the mechanism.

I claim:

1. A variable-speed transmission mechanism comprising, a driving member, a friction roller, a friction clutch for coupling the roller to the driving member, friction cones engaging the roller, means for displacing the roller along the cones, a member constrained to rotate with the driving member, two sets of pinions carried by said member, a gear constrained to rotate with the cones meshing with one set of pinions, a driven member, a gear constrained to turn with the driven member in mesh with the other set of pinions, a brake for the friction clutch adapted to engage the same when the friction clutch is not coupled to the driving member, whereby the friction cones are prevented from turning, substantially as and for the purpose set forth.

2. A variable-speed transmission mechanism comprising,—a driving member, a friction roller, a friction clutch for coupling the roller to the driving member, means for operating the clutch, a brake for the clutch, means connecting the brake to the clutch-operating means so that the brake is applied to the clutch when the same has passed neutral position and the roller is uncoupled from the driving member, friction cones engaging the roller, means for displacing the roller along the cones, a member constrained to rotate with the driving member, two sets of pinions carried by said member, a gear constrained to rotate with the cones meshing with one set of pinions, a driven member, and a gear constrained to turn therewith in mesh with the other set of pinions.

3. A variable-speed transmission mechanism comprising,—a driving member, a friction roller driven thereby, friction cones engaging the roller, means for displacing the roller along the cones, a member constrained to rotate with the driving member, two sets of pinions carried by said member, a gear constrained to rotate with the cones meshing with one set of pinions, a driven member, a gear constrained to turn with the driven member in mesh with the other set of pinions, and means for preventing the rotation of the cones substantially as and for the purpose set forth.

4. A variable-speed transmission mechanism comprising,—a driving member, a friction roller driven thereby, friction cones engaging the roller, means for displacing the roller along the cones, a pinion constrained to rotate with each cone, a gear in mesh with said pinions, a second gear constrained to turn with said first gear, a member constrained to rotate with the driving member, two sets of pinions carried by said member, one of which sets is in mesh with said second gear, a driven member, a gear constrained to rotate therewith in mesh with the other set of pinions, and means for preventing the rotation of the cones, whereby the driven member is reversed.

5. A variable-speed transmission mechanism comprising,—a driving member, a friction roller driven thereby, friction cones engaging the roller, means for displacing the roller along the cones, a pinion constrained to revolve with each cone, a gear in mesh with said pinion, a second gear constrained to rotate with the first, a member constrained to rotate with the driving member, pins carried by said member, pinions on said pins in mesh with the second gear, a driven member, a gear constrained to rotate therewith, other pinions on said pins in mesh with said gear, and means for preventing the rotation of the cones for reversing the driven member.

6. A variable-speed transmission mechanism comprising,—a driving member, a friction roller driven thereby, friction cones engaging the roller, means for displacing the roller along the cones, a driven member, planetary gearing on the driving member, in mesh with the driven member and the friction cones, and means for preventing the rotation of the cones whereby the direction of rotation of the driven member is reversed.

7. A variable-speed transmission mechanism comprising,—a driving member, a driven member, planetary gears connecting the driven member to the driving member, a frictional, variable-speed device driven by the driving member and engaging the planetary gears, and means for preventing the rotation of the frictional, variable-speed device while the driving member is rotated for reversing the direction of rotation of the driven member.

8. A variable-speed transmission mechanism comprising,—a pinion carrier, means for revolving said pinion carrier, two sets of pinions revoluble on said carrier, a driven member including means coupling it to one set of pinions, friction cones including means coupling them to the other set of pinions, and a friction roller engaging said cones and connected to said means for driving the carrier.

9. A variable-speed transmission mechanism comprising a driving member, a friction roller driven thereby, friction cones engaging the roller, means for displacing the roller along the cones, a planetary gearing having a part constrained to rotate with the driving member, said planetary gearing having a driving portion coupled to the friction cones, and a driven member coupled to a third portion of the planetary gearing.

10. A variable speed transmission mechanism comprising,—a driving member, a friction roller driven thereby, friction cones engaging the roller, means for displacing the roller along the cones, a pinion carrier constrained to rotate with the driving member, two sets of pinions revoluble on said carrier, a gear constrained to rotate with the cones meshing with one set of pinions, and a driven member, including a gear, in mesh with the other set of pinions.

11. A variable-speed transmission mechanism comprising a driving member, a driven member, planetary gears connecting the driving and driven members, friction cones, including means gearing them to the planetary gearing, and a friction roller engaging said cones and connected to said driving member.

In testimony whereof I have signed my name to this specification in the presence of two subscribing witnesses.

SAMUEL P. WHITESIDE.

Witnesses:
C. R. WELLS,
H. L. DRAKE.

Copies of this patent may be obtained for five cents each, by addressing the "Commissioner of Patents, Washington, D. C."